US008328218B2

(12) United States Patent
Rush

(10) Patent No.: US 8,328,218 B2
(45) Date of Patent: Dec. 11, 2012

(54) COMMUTER VEHICLE

(75) Inventor: Philip A. Rush, Portland, OR (US)

(73) Assignee: Columbia Cycle Works, LLC, Portland, OR (US)

(*) Notice: Subject to any disclaimer, the term of this patent is extended or adjusted under 35 U.S.C. 154(b) by 258 days.

(21) Appl. No.: 12/502,093

(22) Filed: Jul. 13, 2009

(65) Prior Publication Data
US 2011/0006500 A1  Jan. 13, 2011

(51) Int. Cl.
*B62K 5/08* (2006.01)
*B62M 6/90* (2010.01)
*B62J 17/08* (2006.01)

(52) U.S. Cl. ............... 280/269; 280/93.506; 280/288.2; 280/212

(58) Field of Classification Search .......... 280/62, 280/288.1, 288.2, 288.3, 267, 268, 269, 778, 280/93.502, 93.503, 93.506, 93.507, 93.505, 280/93.504, 93.51, 89.12
See application file for complete search history.

(56) References Cited

U.S. PATENT DOCUMENTS

| | | | | |
|---|---|---|---|---|
| 1,010,178 A | * | 11/1911 | Roberts | 280/1.193 |
| 1,305,298 A | * | 6/1919 | Marceau | 280/93.503 |
| 1,520,598 A | * | 12/1924 | Reynolds | 280/93.51 |
| 3,453,003 A | * | 7/1969 | Marsell | 280/93.503 |
| 3,913,929 A | * | 10/1975 | Matsuura | 280/7.14 |
| 4,220,348 A | * | 9/1980 | Low | 280/93.506 |
| 4,293,052 A | * | 10/1981 | Daswick et al. | 180/219 |
| 4,410,198 A | * | 10/1983 | Fernandez et al. | 280/282 |
| 4,460,190 A | * | 7/1984 | Spiess | 280/247 |
| 4,497,502 A | | 2/1985 | Forbes et al. | |
| 4,799,704 A | | 1/1989 | Colarusso | |
| 5,069,469 A | | 12/1991 | Rosengrant et al. | |
| 5,263,732 A | | 11/1993 | Harmeyer | |
| 5,343,973 A | | 9/1994 | Lanker | |
| 5,544,906 A | | 8/1996 | Clapper | |
| 5,806,622 A | * | 9/1998 | Murphy | 180/210 |
| 6,604,757 B1 | * | 8/2003 | Huang | 280/778 |
| 6,709,013 B2 | * | 3/2004 | Renfroe et al. | 280/778 |
| 7,073,822 B1 | * | 7/2006 | Renfroe et al. | 280/771 |

FOREIGN PATENT DOCUMENTS

| | | | |
|---|---|---|---|
| DE | 3109555 A1 | * | 2/1983 |
| DE | 3321142 A1 | * | 12/1984 |
| FR | 2583369 A1 | * | 12/1986 |
| FR | 2651742 A1 | * | 3/1991 |

* cited by examiner

*Primary Examiner* — Joseph Rocca
*Assistant Examiner* — Wesley Potter
(74) *Attorney, Agent, or Firm* — Klarquist Sparkman, LLP

(57) ABSTRACT

Disclosed commuter vehicles include a chassis that includes a frame, opposed first and second steerable front wheels, a trailing rear wheel, and a linear-input steering mechanism for controlling an orientation of the first and second steerable front wheels. The commuter vehicles also include a drivetrain for transmitting rotational motion and torque from a power-input source to rotational motion of the trailing rear wheel, and a body defining a cockpit and being supported by the chassis. An outer-most lateral dimension of the body corresponds to a maximum outer-most lateral dimension of the commuter vehicle. Embodiments of linear-input steering mechanisms compatible with commuter vehicles being so dimensioned as to fit through an open door are described.

16 Claims, 10 Drawing Sheets

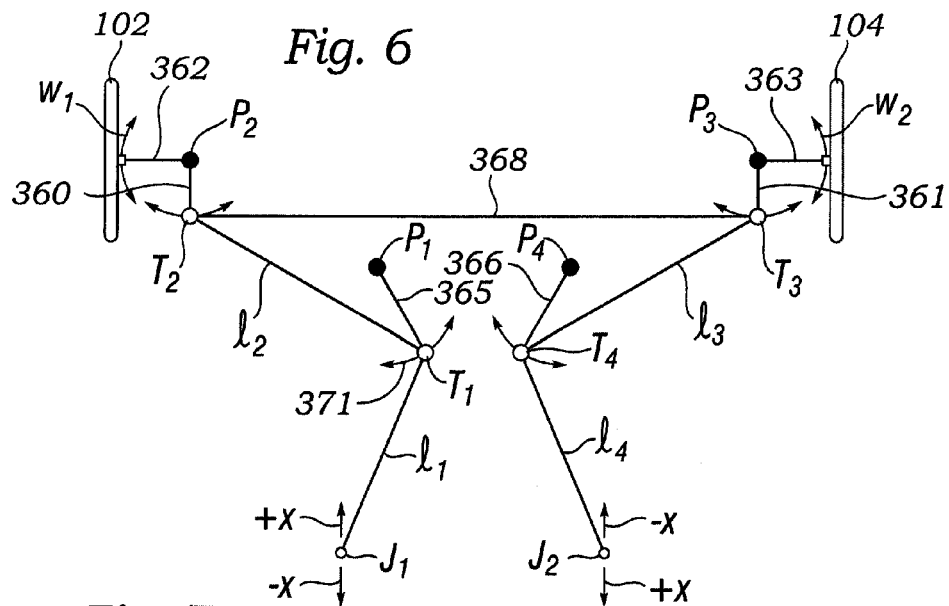
Fig. 6
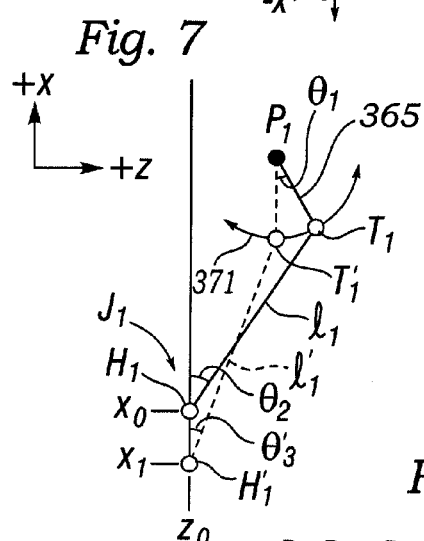
Fig. 7
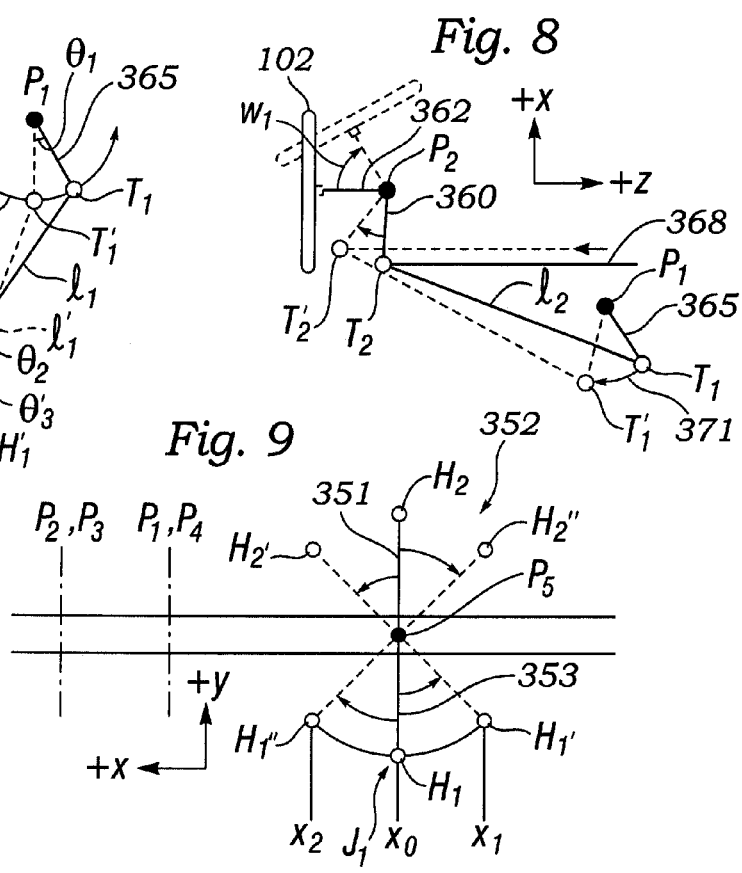
Fig. 8
Fig. 9

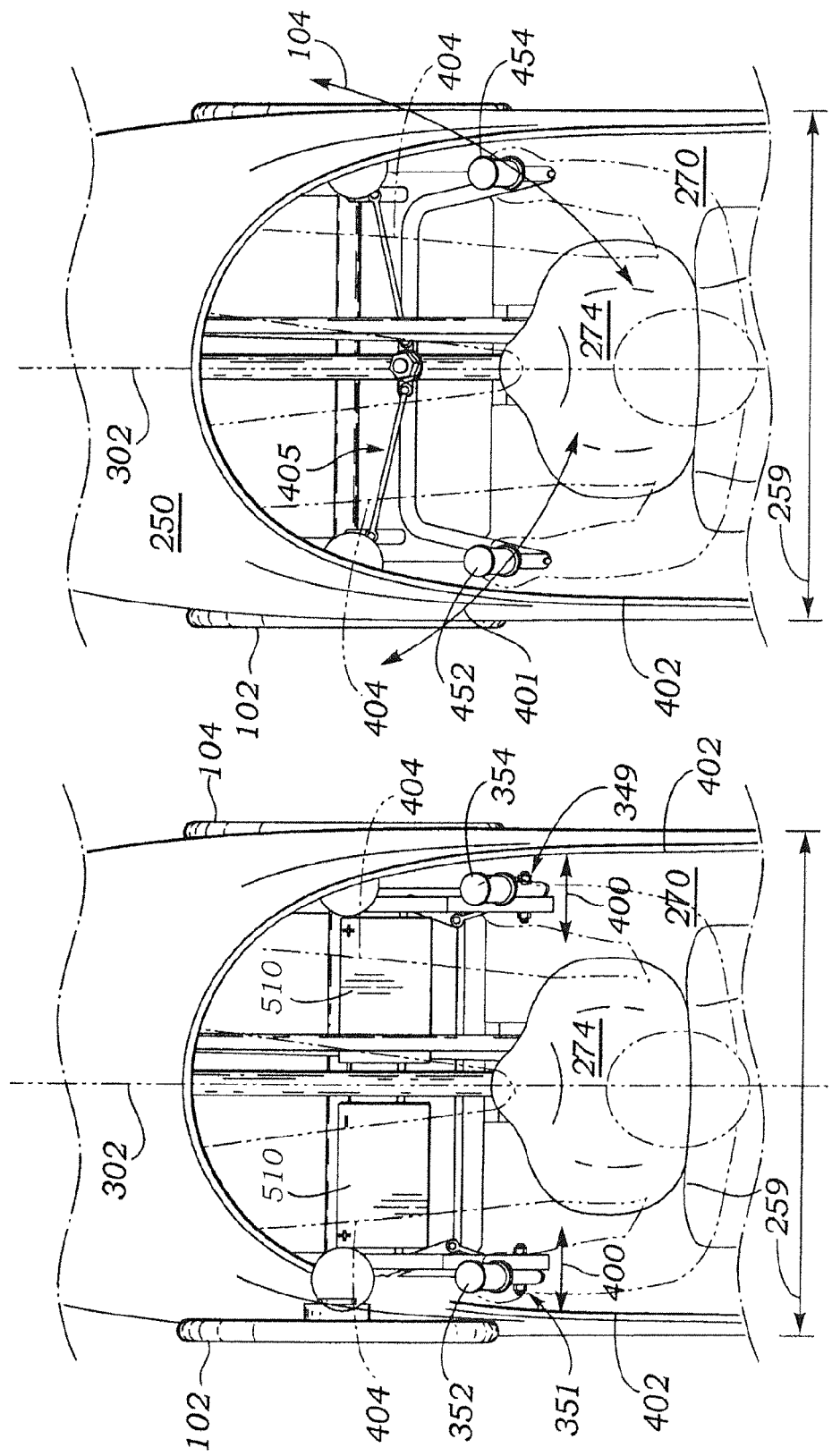

COMMUTER VEHICLE

FIELD

The present disclosure relates to commuter vehicles, and more particularly to steering mechanisms for such vehicles being powered, at least partially and/or during one mode of operation, by a user.

BACKGROUND

Commuter vehicles have been used for centuries and such vehicles have been powered by people (users and others), animals and various power-conversion machines (e.g., internal combustion engines). During the last century, machine driven vehicles such as automobiles, motorcycles and scooters have been popular vehicles for commuting, in part due to their long operating range, relative affordability and satisfactory reliability. However, with rising fuel costs, increased traffic and growing concern over environmental side-effects of using carbon-based fuels, bicycles and other user-powered vehicles have become increasingly popular.

Bicycles and other user-powered vehicles are convenient for many reasons. For example, they are lightweight, small and easily stored (e.g., in a living room, office, garage or public storage rack). Tricycles and other pedal driven-cycles are also convenient for similar reasons.

Historically, however, such vehicles suffer several disadvantages. For example, many user-powered vehicles are designed to be lightweight to improve cruising speed, so many do not incorporate a body or any fairings. As a consequence, users are subjected to the elements (e.g., precipitation) while using these vehicles. Many potential users have thus been deterred from regularly using user-powered (sometimes also referred to as "human-powered" vehicles).

SUMMARY

Embodiments of linear-input steering mechanisms are disclosed. In some exemplary embodiments, a first steering control is movable in a first substantially vertical plane and a first control arm has a pivotally retained distal end and a proximal end. A first kingpin has a pivotally retained steering arm extending therefrom and defines a first kingpin pivot axis. A first linkage extends between a proximal end being pivotally coupled to the steering control, and a distal end being pivotally coupled to the proximal end of the control arm. A second linkage extends between a proximal end being pivotally coupled to the proximal end of the control arm and the distal end of the first linkage, and a distal end being pivotally coupled to the pivotally retained steering arm at a location spaced from the first kingpin pivot axis.

Some embodiments include a second kingpin having a second pivotally retained steering arm extending therefrom and defining a second kingpin pivot axis. A tie rod can extend between the steering arms and be pivotally coupled to each of the steering arms.

The first steering control can include a substantially linear member extending in a substantially vertical plane from a proximal end to a distal end. The proximal end of the first linkage can be pivotally coupled to the distal end of the first linear steering control member.

The first kingpin can define a first stub axle extending from the first kingpin pivot axis. The first stub axle can be angularly spaced from the first steering arm. A hub and wheel assembly can be rotatably coupled to the first stub axle. An in-plane force applied to the first steering control can urge the hub and wheel assembly to move through an arc extending about the first kingpin pivot axis.

A second steering control can be movable in a second substantially vertical plane laterally spaced from the first substantially vertical plane. A second control arm can have a pivotally retained distal end and a proximal end. A third linkage can extend between a proximal end being pivotally coupled to the second steering control, and a distal end being pivotally coupled to the proximal end of the second control arm. A fourth linkage can extend between a proximal end being pivotally coupled to the proximal end of the second control arm and the distal end of the third linkage, and a distal end being pivotally coupled to the second pivotally retained steering arm at a location spaced from the second kingpin axis.

In other exemplary embodiments of linear-input steering mechanisms, a first steering control is movable in a first substantially vertical plane. A control member has a pivotally retained apex. A first control arm extends from the apex, and a second control arm extends from the apex. The first control arm has a proximal end spaced from the apex. The second control arm has a distal end spaced from the apex. A first kingpin has a pivotally retained steering arm extending therefrom and defines a kingpin axis. A first linkage extends between a proximal end being pivotally coupled to the steering control, and a distal end being pivotally coupled to the proximal end of the first control arm. A second linkage extends between a proximal end being pivotally coupled to the distal end of the second control arm and a distal end being pivotally coupled to the pivotally retained steering arm at a location spaced from the kingpin axis.

Embodiments of commuter vehicles are also disclosed. A commuter vehicle can include a chassis comprising a frame, opposed first and second steerable front wheels, a trailing rear wheel, and a linear-input steering mechanism for controlling an orientation of the first and second steerable front wheels. Disclosed embodiments of linear-input steering mechanisms can be incorporated in the commuter vehicle. The commuter vehicle can also have a drive-train for transmitting rotational motion and torque from a power-input source to rotational motion of the trailing rear wheel. A body can define a cockpit and be supported by the chassis. An outer-most lateral dimension of the body can corresponds to a maximum outer-most lateral dimension of the commuter vehicle.

An outer-most lateral dimension of the body can be between about 24-inches and about 38-inches. The body can be so dimensioned as to fit through an open door having an open lateral dimension of about 30-inches.

The drive-train can include one or more of a human-powered chain-driven transmission, an electric motor, a hydrogen fuel cell, an electric generator, a battery and an internal combustion engine. The trailing rear wheel of the commuter vehicle can be a first trailing rear wheel. The commuter vehicle can include a second trailing rear wheel coaxially aligned with and laterally spaced from the first trailing rear wheel.

The foregoing and other features and advantages will become more apparent from the following detailed description, which proceeds with reference to the accompanying drawings.

BRIEF DESCRIPTION OF THE DRAWINGS

FIG. 6 shows a schematic diagram of a top-plan view of the steering mechanism (e.g., from above the chassis) shown in FIG. 3.

FIG. 7 shows a portion of the schematic diagram shown in FIG. 6 in neutral and right-turn biased positions.

FIG. 8 shows another portion of the schematic diagram shown in FIG. 6 in neutral and right-turn biased positions.

FIG. 9 shows a schematic diagram of a side-elevation view of the steering mechanism shown in FIG. 3.

FIG. 12A shows a top-plan view of the commuter vehicle shown in FIG. 1 having the canopy open and having batteries installed. FIG. 12B shows a top-plan view of interference between a conventional steering mechanism and a narrow body dimensioned to fit through a door, as disclosed herein.

DETAILED DESCRIPTION

This disclosure makes reference to the accompanying drawings which form a part hereof, wherein like numerals designate like parts throughout. The drawings illustrate specific embodiments, but other embodiments may be formed and structural changes may be made without departing from the intended scope of this disclosure.

Overview

Figure 1:
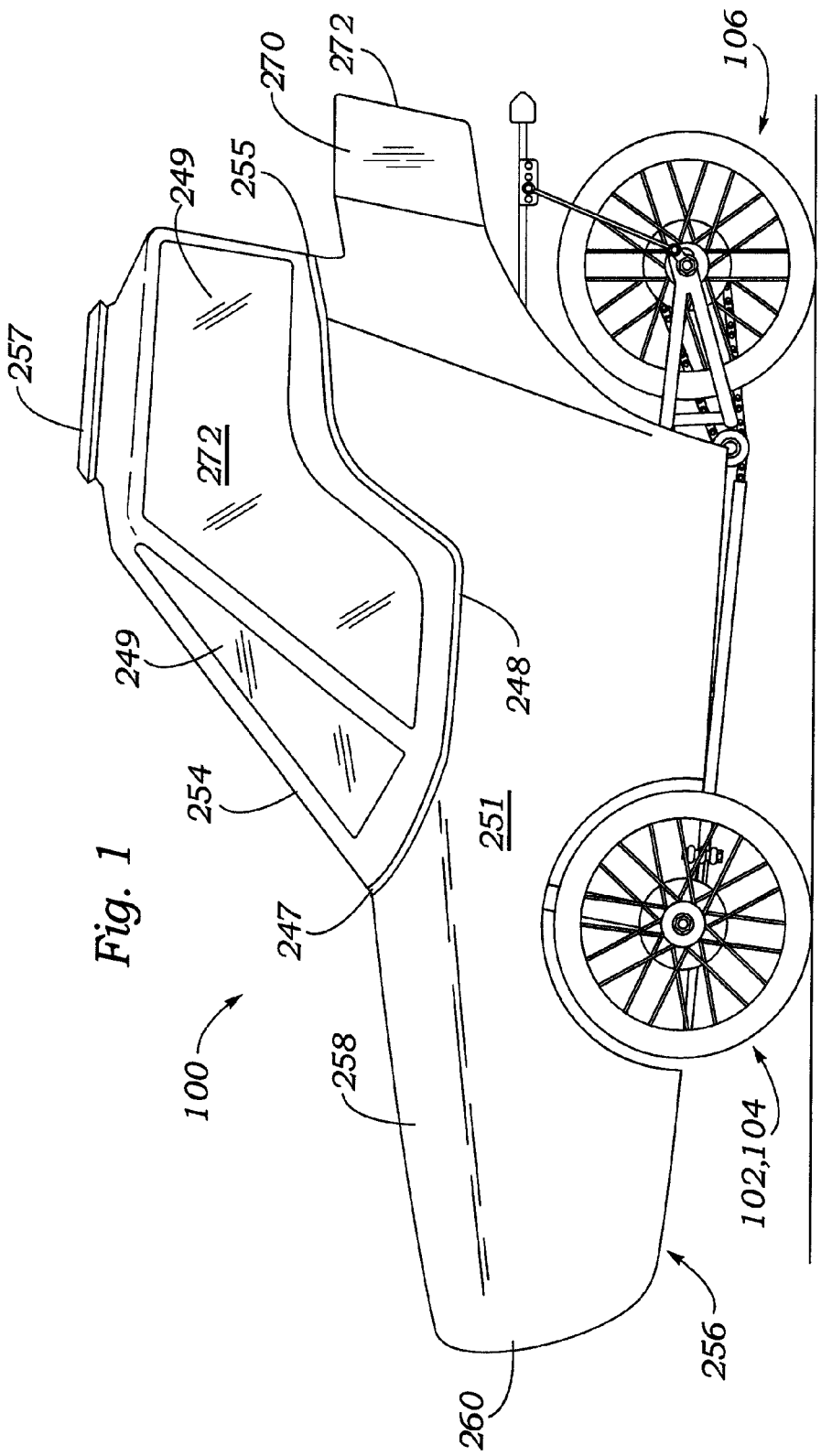
FIG. 1 shows a side-elevation view of a commuter vehicle as disclosed herein.
Figure 2:
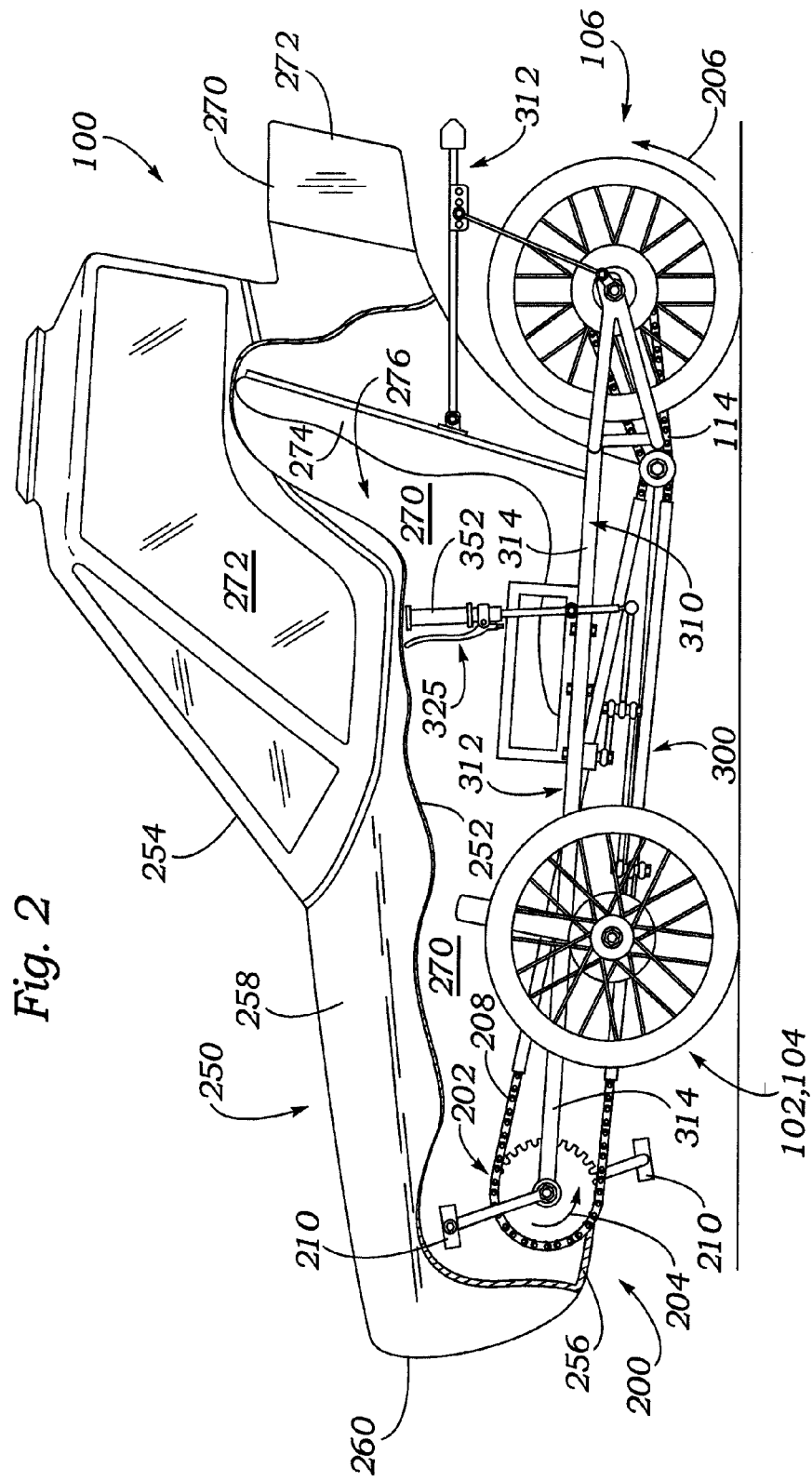
FIG. 2 shows a side-elevation view of the commuter vehicle shown in FIG. 1 having a body shown partially cut-away to expose interior features of the vehicle.
Figure 3:
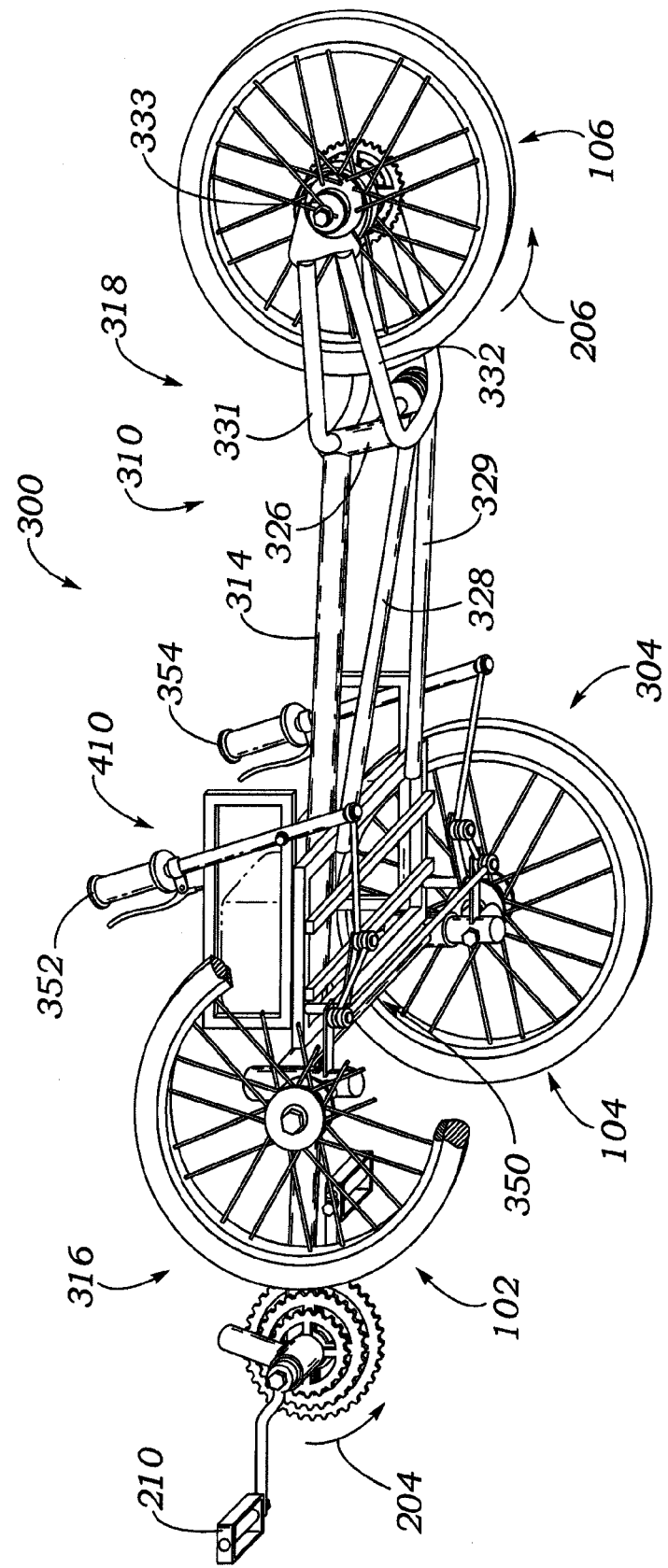
FIG. 3 shows an isometric view of the undercarriage (i.e., underneath the chassis) of the commuter vehicle shown in FIG. 1. One embodiment of a steering mechanism is also shown.

Referring to FIG. 1, one embodiment of a commuter vehicle 100 is shown in side-elevation. As will become more evident, the commuter vehicle 100 shown in FIG. 1 rides on three wheels 102, 104, 106, with two wheels 102, 104, in front and one trailing wheel 106 being positioned in a plane (e.g., a vertically extending mid-plan 302 shown in FIGS. 4 and 12) approximately centered between the two front wheels. As seen in FIGS. 2 and 3, the commuter vehicle comprises a drive-train 200, a body 250 and a chassis 300. Some embodiments of commuter vehicles comprise, inter alia, ergonomic systems such as music systems, lighting systems, HVAC systems, safety systems such as airbag systems, global positioning systems (GPS), two-way communications systems, and other types and examples of subsystems (not shown) without departing from the concepts described herein.

The drive-train 200 comprises a transmission 202 for transmitting rotational motion and torque (indicated by the arrow 204) from a power-input source (e.g., pedals, crank and sprocket, an electric motor) to rotational motion 206 of one or more drive-wheels, such as for example the rear wheel 106. The commuter vehicle 100 shown in FIG. 1 has a chain 202 and chain-driven rear wheel 106 powered by an electric motor (not shown) and/or pedals 210 pedaled by a driver.

Figure 11:
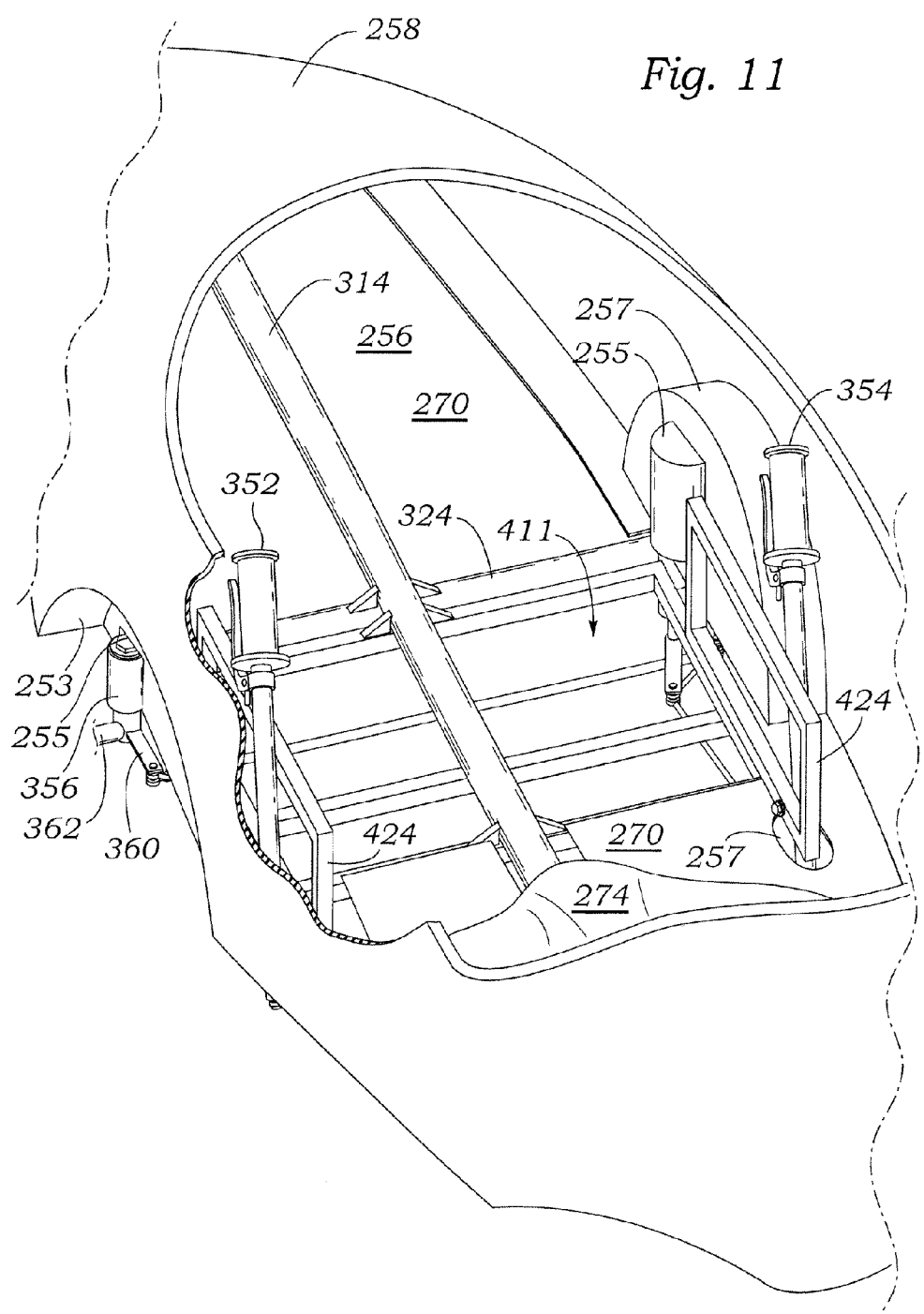
FIG. 11 shows a partially cut-away, isometric view of the interior of the commuter vehicle shown in FIG. 1 (without any batteries installed).

With further reference to FIG. 2, the body 250 comprises a shell 252 coupled to the chassis 300 and defines a driver cockpit 270. In some embodiments, a canopy 254 encloses an upper portion 272 of the cockpit. The body 250, in many embodiments having a floor pan 256, substantially protects the driver (and any passengers, in multi-person embodiments) from the elements (e.g., wind, rain, snow) and any road debris, including standing water or spray therefrom. The shell 252 also defines recessed features 253, 255, 257 (FIG. 11) contoured to receive the left wheel 102, the king-pins 356, 358, and the right wheel 104, respectively. Such contoured features maintain a large open cockpit 270 while simultaneously creating an impermeable barrier to the elements. The outer surface 258 of the body may be substantially impenetrable by the elements and small road debris (e.g., road spray, rocks and pebbles of the type and size that are common on paved roads).

With reference to FIGS. 1 and 2, an embodiment of the body 250 comprises a lower portion 251 and a canopy portion 254. The lower portion 251 comprises a substantially unitary construction defining the outer surface 258 and the floor pan 256. The floor pan 256, in turn, defines several openings 257 (FIG. 11) being sized sufficiently to allow steering and drive-train members, as well as ancillary components such as wires, etc., to extend therethrough while maintaining sufficient passenger protection from the elements and road debris.

Referring to FIG. 1, the canopy portion 254 is hingedly affixed to the lower portion 251 and can be raised and lowered to open and close, respectively, access to the cockpit 270 by pivoting the canopy about a hinged connection 255 positioned aft of the cockpit. The canopy portion 254 defines several windows 249 (some of which can be configured to be opened and shut to provide ventilation) enclosing an upper portion 272 of the cockpit 270 to provide adequate visibility of a surrounding environment. The canopy portion 254 also can have an upper window 257 (e.g., a "moon roof" or a "sun roof") that can be opened to provide additional ventilation.

A sealing member 248 can be affixed to one or both of the lower portion 251 and the canopy portion 254 to provide a weather-tight seal when the canopy portion 254 was lowered or closed position to substantially prevent water and/or air from penetrating the cockpit 270 (FIG. 1). A latching member 247 can retain the canopy portion 254 in the lowered position and release the canopy for opening (not shown). A support member (not shown) can retain the canopy in a raised position.

As shown in FIGS. 1 and 2, the body 250 of the commuter vehicle 100 defines a generally aerodynamic outer surface 258 extending rearwardly from a leading, rounded nose portion 260 having a relatively small, longitudinal cross-sectional area. The outer surface 258 is generally symmetric about a vertically extending mid-plane 302 (FIGS. 4 and 12) positioned approximately centered between the front wheels 102, 104 and approximately coincident with the rear wheel 106.

The cockpit 270 (also shown in FIG. 12A) defined by the body 250 is a region in which the driver sits during normal operation of the commuter vehicle 100, and which is protected from the elements by the body 250. The cockpit 270 has installed therein a seat 274 configured to accommodate a driver in a recumbent position, e.g., with the driver's torso being slightly reclined rearward of the driver's hips and the driver's legs extending forward of the driver's hips. Steering controls 351, 352 and brake levers 325 (and, in some instances, pedals 210 for providing at least auxiliary power to the drive-train 200) are accessible and useable from within the cockpit 270.

The longitudinal cross-sectional area of the body 250 grows from the nose portion 260 to a maximum cross-sectional area corresponding to a maximum outer-most width 259 (FIG. 12A) being longitudinally positioned in a region typically occupied by the driver's torso (e.g., the driver's shoulders) when the driver is seated in the seat 274. The longitudinal cross-section of the body 250 tapers rearwardly of the maximum cross-section 259 to define a tail portion 270 of the body 250 having a trailing edge 272 being substantially coincident with the mid-plane 302.

Referring to FIGS. 2 and 3, the chassis 300 comprises a frame 310 (including members 312 for supporting the body 250, the passenger seat 274 and the drive-train 200), a steering subsystem 350 (also referred to herein as a "steering mechanism"), and a plurality of wheels 102, 104, 106 (and the associated hubs, bearings, tires, etc.). Each of these chassis-subsystems is described more fully below.

In many embodiments, the outermost width 259 (FIG. 12), e.g., is the "widest" portion of the commuter vehicle 100 and is so dimensioned as to fit through an open door (not shown), e.g., a residential door defining an interior opening having a width about about 30-inches. Such a narrow commuter vehicle 100 allows users to safely store the vehicle in an office or a residence when the vehicle is not being used, but leaves little space 400 (FIGS. 11 and 12) between an inner surface of the body 402 and a driver's legs 404 for steering controls.

Such a narrow body 250 being so dimensioned as to fit through a door renders many conventional steering mechanisms unusable, particularly steering mechanisms 405 provided with commercially available tadpole-configuration recumbent tricycles and shown in FIG. 12B. As FIG. 12B shows, the arc 401 through which the handles 452, 454 swing interferes with the body 250 and its inner surface 402, rending the conventional steering mechanism inoperable.

Disclosed herein are, inter alia, linear-input steering mechanisms 350 discovered to be compatible with narrow and lightweight commuter vehicles 100. Disclosed linear-input steering mechanisms allow a user to be positioned between vertically extending (or substantially vertically extending), upright handles 352, 354 (FIG. 12A), and yet are narrow enough throughout their range of motion so as to be compatible with the disclosed narrow bodies being dimensioned to fit through a door in contrast to conventional steering mechanisms.

Chassis

Figure 4:
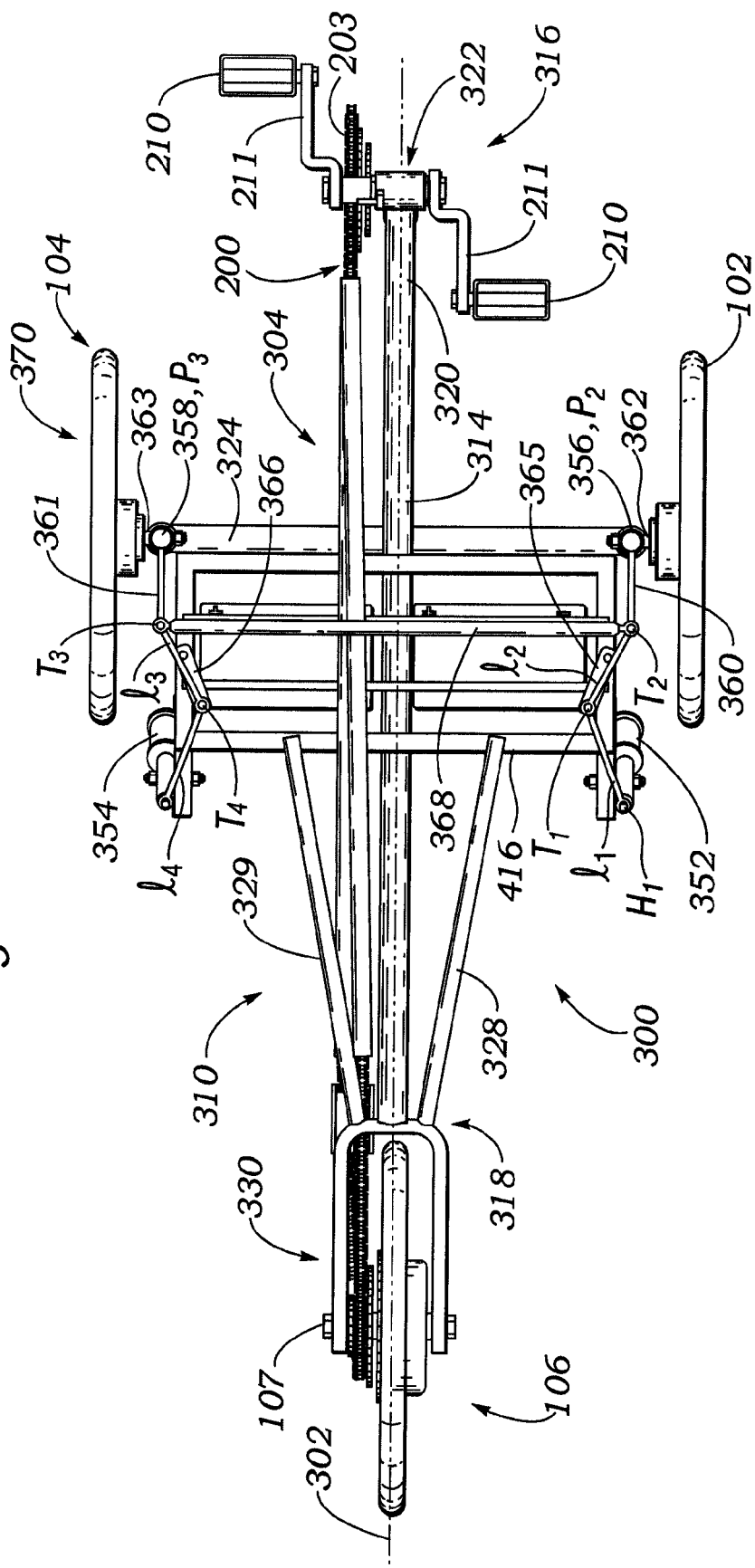
FIG. 4 shows a plan-elevation view of the undercarriage shown in FIG. 3.

Referring to FIGS. 3 and 4, a chassis 300 is shown with the undercarriage 304 visible. In FIG. 3, a portion of the left (front) wheel 102 has been cut away to expose components of the steering mechanism 350. Portions of the drive-train 200 (e.g., the drive-chain 208 (FIG. 2), batteries, electric motor) are not shown in FIG. 3 for clarity.

Frame

The frame 310 comprises a longitudinally extending beam 314 running between a forward end 316 of the chassis 300 and a rear fork-engaging end 318. The forward end 320 (FIG. 4) of the beam 314 comprises a bearing race 322 and support structure for rotatably supporting a pair of cranks 211 and corresponding pedals 210, as well as a forward drive-sprocket 203.

Figure 5:
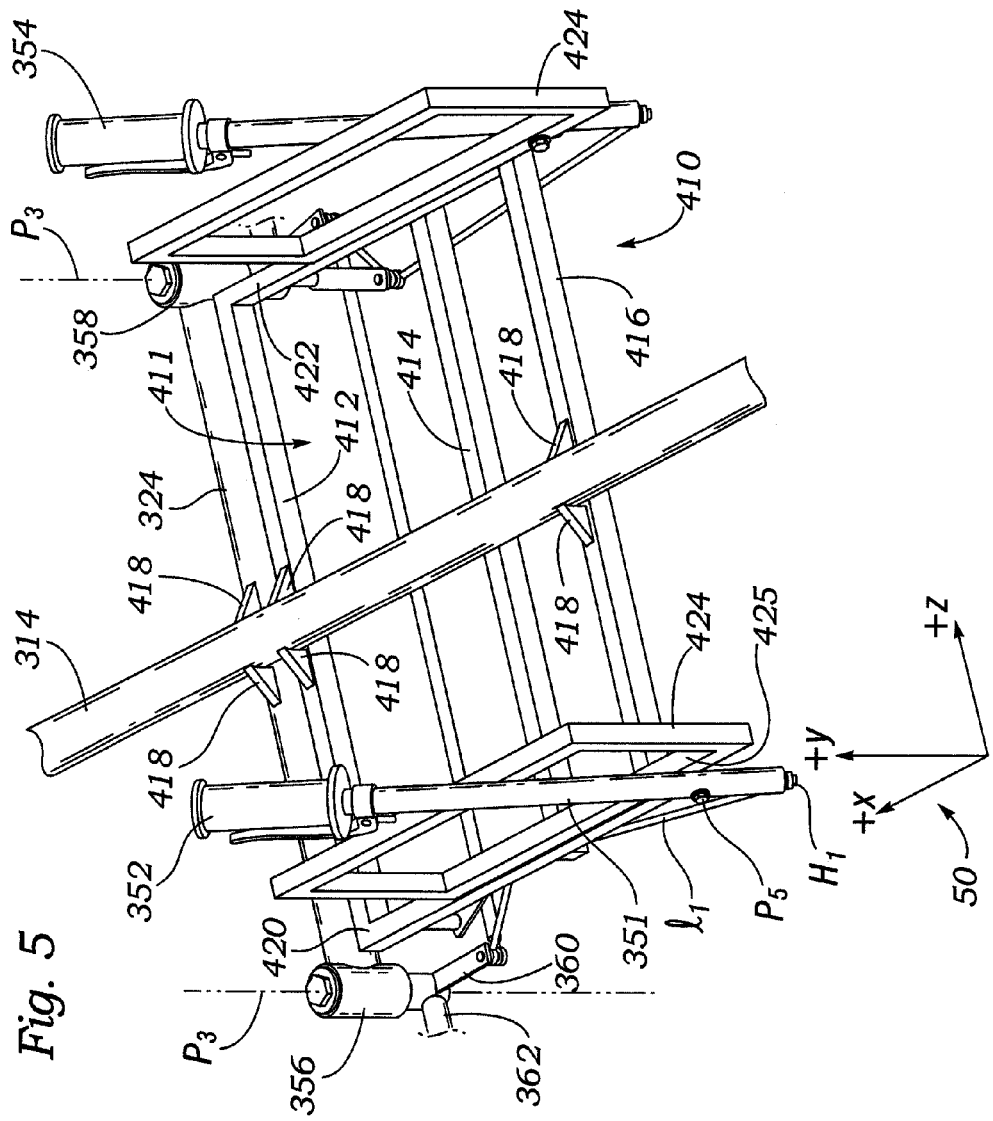
FIG. 5 shows an isometric view of portions of the frame and steering mechanism of the commuter vehicle shown in FIG. 1.

Referring also to FIG. 5, a forward cross-member 324 extends perpendicularly to the beam 314 and comprises a respective king-pin 356, 358 at each of its opposing ends. Each king pin 356, 358 defines a respective pivot axis $P_2$, $P_3$ extending longitudinally therethrough (also referred to as a "kingpin axis"). Each kingpin 356, 358, in part, anchors each of the steering mechanisms disclosed herein to the frame 310, and each kingpin axis $P_2$, $P_3$ defines an axis about which each respective steering arm 360, 361 and stub axle 362, 363 pivots. As described more fully below, each kingpin axis $P_2$, $P_3$ is substantially fixed relative to the frame 310. In a neutral steering position 370 (FIGS. 4, 10A and 10B), each stub axle 362, 363 extends substantially laterally outwardly at a desired angle, orienting corresponding wheel and tire assemblies 102, 104 (including hubs, bearings, etc.) at respective caster angles, camber angles and toe angles.

With further reference to FIG. 5, a sub-frame 410 for supporting one or more batteries 510 (FIG. 12) is positioned aft of the forward cross-member 324. The sub-frame 410 is also referred to herein as a "battery box." The sub-frame, or battery box, 410 can take many forms. By way of example and as shown in FIG. 5, the battery box 410 can comprise three longitudinally spaced cross-members 412, 414, 416. Each of the cross-members 412, 414, 416 extend laterally relative to the beam 314 such that a mid-point of each cross-member is adjacent to the beam (e.g., the midpoint of each cross-member is adjacent to or lies in the vertical plane 302 shown in FIG. 12). Attachment between the beam 314 and the cross-members 412, 414, 416 can be augmented using one or more struts or gussets 418 attached to the beam 318 and a respective cross-member 412, 414, 416. A pair of laterally opposing, longitudinally extending end-members 420, 422 join respective ends of each cross-member 412, 414, 416, forming a floor frame 411 for supporting the floor pan 256 (FIG. 2) and one or more batteries 510 on either side of the beam 314 as shown in FIG. 12A. Respective upright supports (e.g., a rectangular frame) 424 can be removably affixed to each of the end-members 420, 422 for laterally retaining the respective one or more batteries 510. The floor pan 256 can be retained by the upright supports 425 between the upright supports and the end-members 420, 422, and covering the floor frame 411.

In this location of the chassis 300, the battery box 410 supports one or more batteries 510 below the driver's legs 404 without interference when pedaling. In addition, positioning the battery box 410 in this location (e.g., slightly aft of an axis extending between the stud axles 362, 363 of the opposing front wheels 102, 104) tends to stabilize the commuter vehicle's steering mechanism 350 at higher speeds, and maintains a low center-of-gravity for reducing the likelihood of a rollover.

As shown in FIG. 3, the beam 314 extends aft of the battery box 410 and terminates in a joint (e.g., a welded joint) with an upper end of an upright member 326. From the opposing lower end of the upright member 326, a pair of struts 328, 329 extend upwardly and forward, and laterally outward to join the rear-most laterally extending cross-member 416 of the battery box 410 at approximately respective mid-points located between the beam 314 and each respective outer-end of the cross-member 416. Respective U-shaped members 331, 332 extend aft of the upper end and the lower end of the upright member 326 to form a clevis, or fork, 330 for retaining the rear wheel assembly 106. Each opposing side of the clevis defines a slot 333 for receiving opposing ends of an axle 107 in a known manner such that a single wheel and tire (e.g. rear wheel 106) are free to rotate within the respective U-shaped members 331,332 defining the clevis 330.

Steering

One example of a linear-input steering mechanism 350 being compatible with a narrow-body will now be described with reference to FIGS. 3-12 and the coordinate system 50 shown in FIG. 5. In the example shown in FIG. 5, respective vertically extending handles 352, 354 are pivotably mounted to a portion 425 of each upright support 424. Other steering embodiments, having one or more vertically extending handles slidably or pivotably mounted to another member of the chassis are possible, as should become more apparent from the description of steering mechanisms that follows. As used herein, "vertically extending" means extending in a substantially vertical plane relative to a fixed frame of reference such as the ground. As used herein, a "substantially vertical plane" means a plane oriented to within about 45-degrees of a vertical plane, such as, in some instances, within about 20-degrees of a vertical plane. In some embodiments, the vertically extending handles 352, 354 pivot within respective planes being within 5-degrees, or less, of a vertical plane.

FIGS. 6, 7, 8 and 9 show schematic representations of various linkages and other portions of the exemplary steering mechanism 350. Ends of coupled linkages and other components of the steering mechanism 350 can be coupled using pinned connections, ball joints and other known linkage couplings.

Referring to FIG. 6 (a top-plan view), a driver can provide steering input by manipulating the vertically extending handles 352, 354 such that a junction $J_1$ between a proximal end of the linkage 11 and the handle 352 moves in a +X-direction or a −X-direction. For example, with reference to FIGS. 5 and 9, a handle 352 is shown being pivotably mounted to a frame member 425 at a pivot $P_5$ such that an upper portion of the steering control 351 (e.g., approximately one-half of the handle) extends above the pivot $P_5$ to a free end, and a lower portion 353 (e.g., approximately one-half of the handle) extends below the pivot $P_5$ to an opposing end joined to the first linkage $l_1$ at the junction $J_1$. Pivoting the left handle 352 such that the upper portion 351 of the left handle moves rearwardly (e.g., with reference to FIG. 9, from a neutral position $H_2$ to a non-neutral position $H_2''$), the junction $J_1$ between the lower portion 353 of the handle 352 and the proximal end of the linkage $l_1$ moves forward in a +X-direction to the position $H_1''$. Alternatively, a slidably mounted handle can be made to slide fore and aft such that the junction $J_1$ moves in a corresponding +X- or −X-direction.

Figure 10A:
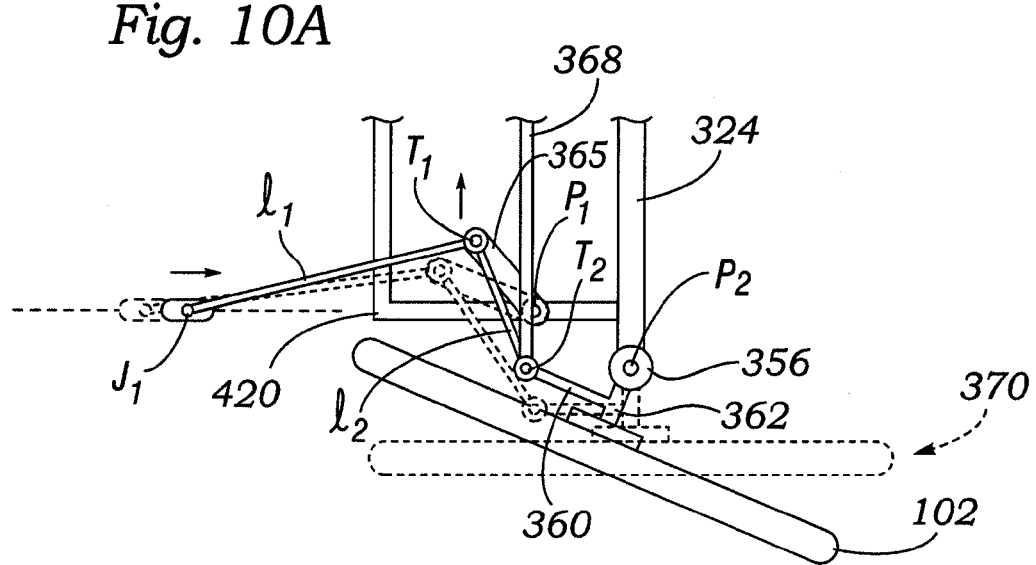
FIGS. 10A and 10B show a bottom-plan view of a portion of the steering mechanism shown in FIG. 3 (and shown in schematic representation in FIG. 6) in a left-turn orientation (FIG. 10A) and a right-turn orientation (FIG. 10B) relative to a neutral orientation.
Figure 10B:
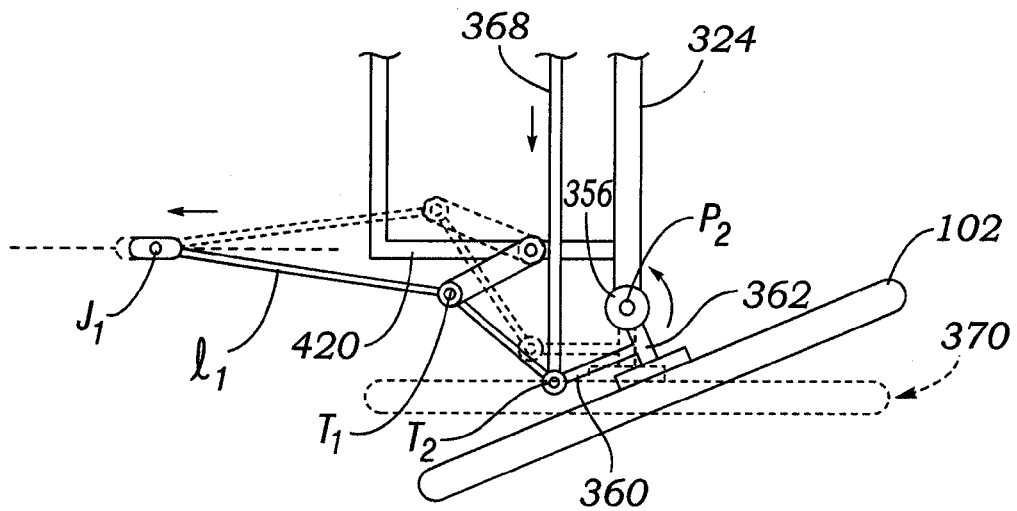

With respect to the steering mechanism 350 shown in FIG. 6, movement of the junction $J_1$ in a forward direction (e.g., moving the lower portion 353 in a +X-direction from the neutral $X_0$ position) can result in turning the wheels 102, 104 from the neutral position shown in FIG. 6 through respective arcs $W_1$ and $W_2$ to a left-turn orientation (e.g., shown from below in FIG. 10A). Corresponding to this motion of the junction $J_1$ and each of the wheels 102, 104, the junction $J_2$ (which corresponds to the right handle 354) moves in a rearward direction (e.g., a corresponding +X-direction relative to the right handle 354 as shown in FIG. 6). To facilitate and/or adjust the rate of turning through the arcs $W_1$ and $W_2$ from one orientation to another, complementary or opposing steering input forces can simultaneously be applied to each of the handles 352, 354.

The kinematics associated with movement of (and/or steering input forces applied to) either or both of the handles 356, 354 will be described in detail by considering the left one-half of the steering mechanism, shown in FIG. 6 (e.g., the schematics of FIGS. 7 and 8). For convenience in these drawings, solid shading denotes a junction (e.g., junctions $P_1$, $P_2$, $P_3$ and $P_4$) that is free only to substantially pivot, and not to substantially translate in any direction, relative to a fixed frame of reference such as the frame 310 (not shown in FIGS. 6-9). An open circle denotes a pivotable junction (e.g., junctions $J_1$, $T_1$, $T_2$, $J_2$, $T_3$, $T_4$) between members that is free to translate relative to a fixed frame of reference (e.g., the frame 310).

Referring to FIGS. 6 and 7, a first linkage $l_1$ extends between a junction $J_1$ at a proximal end and a junction $T_1$ at a distal end. As noted above, the proximal end of the first linkage $l_1$ is pivotably coupled to the left handle 352 at the junction $J_1$. The distal end of the first linkage $l_1$ is pivotably coupled to a proximal end of a left (or first) control arm 365 at the junction $T_1$. The distal end of the left control arm 365 is pivotably coupled to a frame member (e.g., the member 420 in FIG. 5) at a junction $P_1$.

Referring to FIGS. 7 and 8, solid lines indicate a neutral position 370 (FIG. 10A, 10B), and dashed lines and primed (') reference characters (e.g., $T_1'$) denote an exemplary non-neutral position. Referring to FIG. 7, as the junction $J_1$ moves from a neutral position $X_0$ in a −X-direction to a non-neutral position $X_1$ (e.g., in the $Z_0$ plane shown in FIG. 7), the proximal end of the linkage $l_1$ follows the junction $J_1$. The pivot $T_1$, being located at the free end of the pivotably-retained left control arm 365, is constrained to revolve about the pivot $P_1$. Consequently, the junction $T_1$ (and the left control arm 365) moves clockwise about the pivot $P_1$ (e.g., in the −X-direction and the −Z-direction) through an arc 371 to a non-neutral position $T_1'$. As the junctions $J_1$ and $T_1$ move as just described, the linkage $l_1$ partially rotates in a counter-clockwise direction (moving to the exemplary non-neutral position as indicated by the dashed linkage $l_1'$).

Referring to FIGS. 6 and 8, a second linkage $l_2$ extends between the junction $T_1$ joining the first linkage $l_1$ and the left control arm 365 at a proximal end, and a junction $T_2$ with a steering arm 360 and tie rod 368 at a distal end. The steering arm 360 and a corresponding stub axle 362 extend from the kingpin 356 (FIG. 5) and pivot about the kingpin axis $P_2$. A hub and wheel 102 can be rotatably coupled to a distal end of the stub axle 362 in a known manner.

Referring to FIG. 8, as the control arm 365 revolves about the pivot $P_1$ and the pivot $T_1$ moves clockwise through an arc 371 to a non-neutral position $T_1'$, the linkage $l_2$ urges the junction $T_2$ (and the corresponding proximal end of the steering arm 360) to revolve clockwise about the kingpin axis $P_2$ through an arc (e.g., $W_1$). The stub axle 362 extends from the kingpin at a fixed angle relative to the steering arm 360, so the stub axle 362 (and the wheel 102 at its distal end) also revolves clockwise about the kingpin axis $P_2$ through the arc $W_1$, urging the wheel into a right-turn orientation (e.g., FIG. 10B).

Referring to FIG. 6, a tie rod 368 extends laterally from a left-end pivotably joined to the left-side steering arm 360 and the second linkage $l_2$ at the junction $T_2$ to a right-end pivotably joined to the right-side steering arm 361 and linkage $l_3$ corresponding to the second linkage $l_2$. The right-side steering components mirror those of the left side, so for simplicity, the right-side linkage arrangement will not be further described independently. The steering mechanism in a left-turn orientation can be repositioned in a neutral or right-turn orientation by moving the handles (and thus the coupled linkages) in a direction opposite to the direction used to place the steering mechanism in the left-turn orientation.

Alternative linear-input steering mechanisms are also possible. As used herein, "linear-input steering mechanisms" refers to steering mechanisms controlled and manipulated by moving a steering control in a vertical, or substantially vertical, plane (e.g., the $Z_0$ plane shown in FIG. 7), as opposed to a horizontal, or substantially horizontal plane. In certain embodiments, the linear-input steering mechanism can be controlled and manipulated by moving a steering control within only a vertical or substantially vertical plane.

Figure 13A:
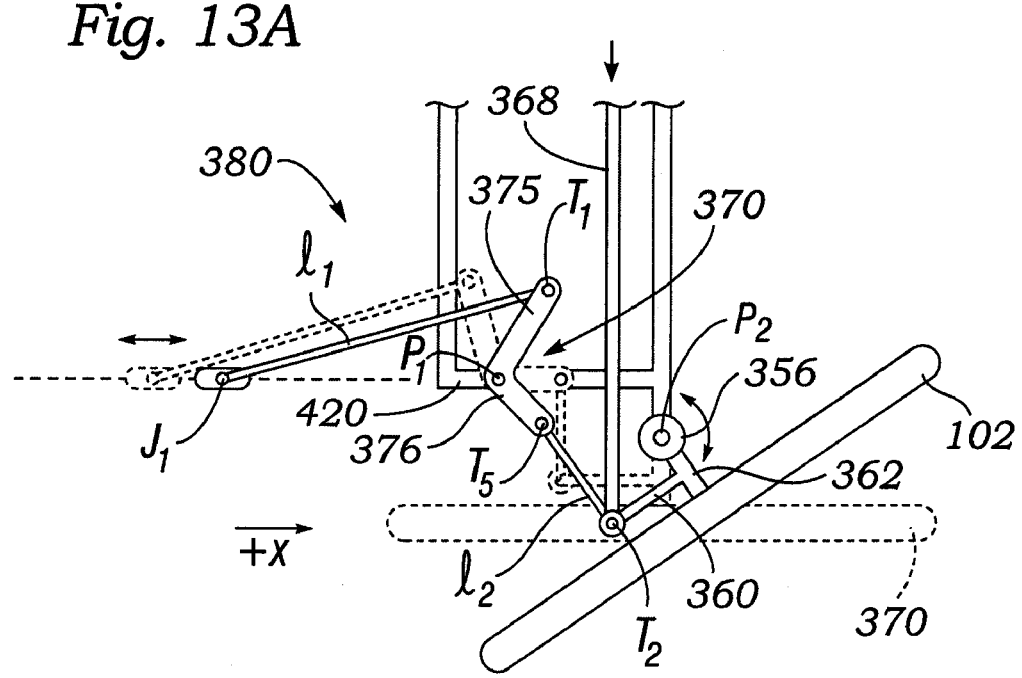
FIGS. 13A and 13B show a bottom-plan view of a portion of an alternative steering mechanism in a right-turn orientation (FIG. 13A) and a left-turn orientation (FIG. 13B) relative to a neutral orientation.
Figure 13B:
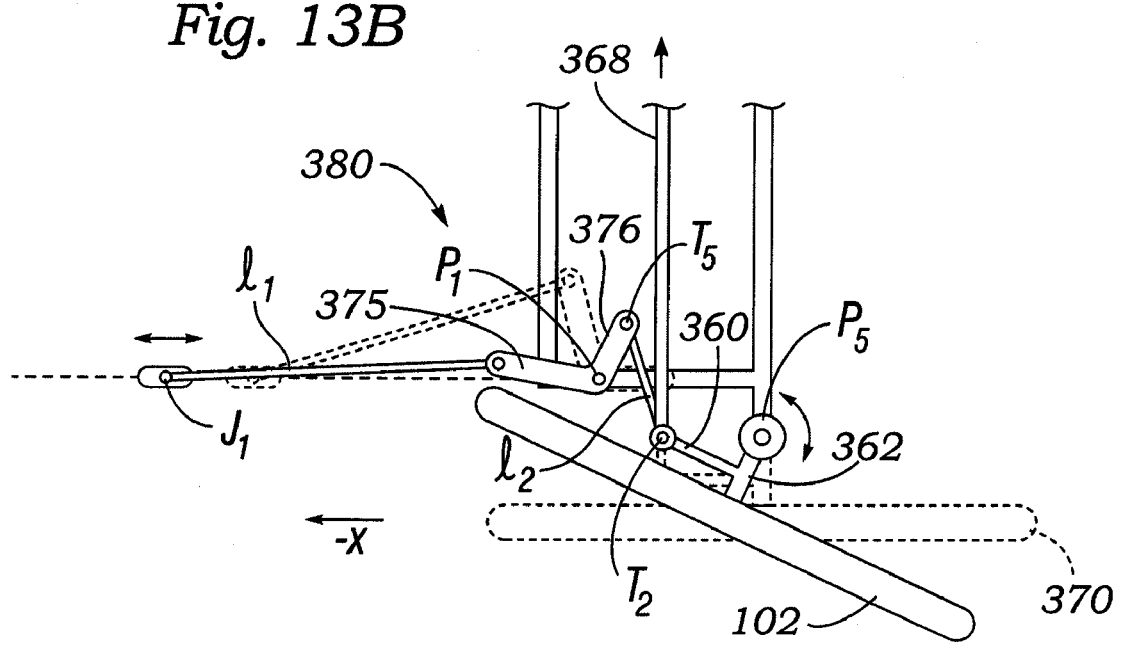

FIGS. 13A and 13B show a plan-view from below a left portion of a commuter vehicle undercarriage having an alternative linear-input steering mechanism 380. In FIG. 13A, the steering mechanism 380 and corresponding wheel are shown in a right-turn orientation relative to a neutral position 370 (shown dashed). Note that in the right-turn orientation shown in FIG. 13A, the junction $J_1$ between the lower end 351 of the left handle 352 (not shown) and the first linkage $l_1$ has moved in the +X-direction, as opposed to the steering mechanism shown in FIG. 10A in which moving the junction $J_1$ in the +X-direction urges the wheels into a left-turn orientation. In FIG. 13B, the steering mechanism and wheel are shown in a left-turn orientation relative to the neutral position 370 (again, shown dashed) by moving the junction $J_1$ in the −X-direction (in contrast to the motion shown in FIG. 10B).

The linkages and associated kinematics of the steering mechanism shown in FIGS. 13A and 13B will now be described. As with the steering mechanism 350 shown in FIGS. 6-9 and 10A and 10B, the steering mechanism 380 shown in FIGS. 13A and 13B includes a first linkage $l_1$ extending between a junction $J_1$ at a proximal end and a junction $T_1$ at a distal end. The proximal end of the first linkage $l_1$ is pivotably coupled to the left handle 352 at the junction $J_1$. The distal end of the first linkage $l_1$ is pivotably coupled to a proximal end of a left (or first) control arm 375 at the junction $T_1$. The distal end of the left control arm 375 is pivotably coupled to a frame member 420 at a junction $P_1$. As with the steering mechanism 350 shown in FIGS. 10A and 10B, the steering mechanism 380 shown in FIGS. 13A and 13B has a kingpin 356 (and corresponding kingpin axis $P_1$) for pivotably anchoring the steering arm 360 and stub axle 362 to the frame 310. In addition, a tie rod 368 extends between the proximal ends of each respective steering arm 360, 361 to couple the motion of one wheel with that of the other wheel, as described above.

However, unlike the steering mechanism 350 depicted in FIGS. 6-9, 10A and 10B, the proximal end of the control arm 375 shown in FIGS. 13A and 13B does not share a straight linkage $l_2$ with the steering arm 360. Instead, the control arm 375 shown in FIGS. 13A and 13B comprises an "L-shaped" member 370 having a first control arm 375 extending from the pivot $P_1$ and being pivotably coupled to the distal end of the first linkage $l_1$, as just described. A second control arm 376 extends from the pivot $P_1$ (e.g., at an angle of about 90-degrees from the first control arm 375) joining a second linkage $l_2$. The linkage $l_2$ extends between a distal end of the second control arm 376 and a proximal end of the steering arm 360.

As shown in FIG. 13A, moving the junction $J_1$ forward in a +X-direction (i.e., in a direction generally toward the kingpin 356 from the neutral position 370), the first control arm 375 shifts in a generally forward direction and the "L-shaped" member 370 pivots in a clockwise direction (when viewed from below the chassis as in FIG. 13A). The second control arm 376 shifts in a corresponding laterally-outward direction and urges the second linkage $l_2$ and the proximal end of the steering arm 360 in a corresponding laterally-outward direction. Shifting the proximal end of the steering arm 360 in a laterally outward direction causes a counter-clockwise rotation (when viewed from below the chassis in FIG. 13A) of the steering arm 360 and stub axle 362 about the kingpin pivot axis $P_2$. This rotation of the steering arm 360 and stub axle 362 about the kingpin axis $P_1$ urges the wheel assembly 102 into a right-turn orientation, as FIG. 13A illustrates.

Reversing the direction of motion of the junction $J_1$ (i.e., moving the junction $J_1$ rearward in the −X-direction and generally away from the kingpin 356 from the neutral position 370) reverses the direction of motion for each component just described and shown in FIGS. 13A and 13B. Consequently, moving the junction $J_1$ to the rear, as indicated in FIG. 13B, urges the wheel into a left-turn orientation.

Components of steering mechanisms 350, 380 as described herein can be constructed of any material suitable for the uses and characteristics described. For example, linkages, bolts, tie-rod ends, etc. can be made of metals, e.g., alloys of steel, and bushings can be made of suitable plastics and/or rubbers.

Wheels, Hubs and Brakes

The illustrated commuter vehicle 100 can incorporate known wheels, hubs and brakes. For example, wheels, hubs and brakes that are commercially available with tadpole-configured recumbent tricycles are used in a working embodiment of the commuter vehicle. Some embodiments can use opposing calipers to directly engage outer portions of a wheel rim to slow wheel rotation. Other embodiments incorporate known disc-brake systems, and some incorporate a hydraulic or hydraulic assisted braking system. One or more brake systems can be actuated by squeezing a lever of the type shown in, for example, FIG. 3 toward an upright handle in a known manner.

Drive-Train

Commuter vehicles as disclosed herein can incorporate one of many known drive-train configurations and can be powered by one or more known power sources. For example, one possible drive-train 200 for a disclosed commuter vehicle 100 is a human-powered (e.g., pedaled) chain-driven transmission of the type commercially available on tadpole-configured recumbent tricycles. This basic drive-train can be supplemented in several ways by adding any of several known power sources having a rotating output shaft (e.g., an electric motor, an internal combustion engine, a hydrogen fuel cell) coupled to a drive axle (e.g., the rear axle 107 of the commuter vehicle shown in the accompanying drawings), thereby forming a hybrid-powered commuter vehicle.

For electric-motor supplemented drive-trains, batteries 510 can be securely installed in the battery box 410. These batteries can be rechargeable, as by connecting them to a battery charger when the commuter vehicle 100 is not in use. The batteries 510 can be at least partially recharged by engaging the electric motor with the drive axle when the commuter vehicle is powered by a separate power source (e.g., when the commuter vehicle is travelling down a hill, when the commuter vehicle is under human power, when the commuter vehicle is powered by a hydrogen fuel cell). In addition, the batteries can be recharged, at least partially, using an array of solar cells that produce an electrical current when exposed to light energy.

Working Embodiment

A working embodiment of the disclosed commuter vehicle will now be described with reference to certain features thereof and FIGS. 6 and 12A.

Referring to FIGS. 6 and 12A, the vertically extending handles 352, 354 of the working embodiment measured about 16-inches long overall. The pivot $P_5$ was located relative to the handles 352, 354 such that the steering controls 351, 349, respectively, measured about 11½ inches long, and the respective lower portions 353 measured about 4½ inches long.

The linkages $l_1$, $l_4$ measured about 8¾ inches long, and the linkages $l_2$, $l_3$ measured about 3¾ inches long. The steering arms 360, 361 measured about 4¼ inches long.

Alternative Embodiments

Although specific examples of commuter vehicles and steering mechanisms have been described herein, variations of the specific examples are possible. For example, the commuter vehicles described above are configured to ride on three wheels in a tadpole configuration. Other wheel configurations are possible, such as two-wheel configurations like a conventional bicycle or motorcycle, three-wheel configurations with one leading wheel and two trailing wheels, and four-wheel configurations.

Directions and references (e.g., up, down, top, bottom, left, right, rearward, forward, etc.) have been used in the detailed description above to facilitate discussion of the drawings, but are not intended to be limiting. For example, certain terms have been used such as "up," "down,", "upper," "lower," "horizontal," "vertical," "left," "right," and the like. These terms are used, where applicable, to provide some clarity of description when dealing with relative relationships, particularly with respect to the illustrated embodiments. Such terms are not, however, intended to imply absolute relationships, positions, and/or orientations. For example, with respect to an object, an "upper" surface can become a "lower" surface simply by turning the object over. Nevertheless, it is still the same surface and the object remains the same. As used herein, "and/or" means "and" as well as "and" and "or."

Accordingly, this detailed description shall not be construed in a limiting sense, and following a review of this disclosure, those of ordinary skill in the art will appreciate the wide variety of garment configurations that can be constructed using the various elements described herein. Moreover, those of ordinary skill in the art will appreciate that the exemplary commuter vehicle bodies, frames, steering mechanisms and components thereof disclosed herein can be adapted to various configurations without departing from the concepts that provide, among other advantages, a lightweight, fuel-efficient commuter vehicle being sufficiently narrow so as to fit through, for example, a standard-width door frame.

In view of the many possible embodiments to which the principles of the disclosed invention may be applied, it should be recognized that the illustrated embodiments are only preferred examples and should not be taken as limiting in scope. Rather, the scope of the disclosure is defined by the following claims. I therefore claim as my invention all that comes within the scope and spirit of these claims.

I claim:

1. A linear-input steering mechanism for an at least partially user-powered commuter vehicle, the linear-input steering mechanism comprising:
    a first steering control movable only in a first substantially vertical plane;
    a first control arm having a pivotally retained distal end and a proximal end;
    a first kingpin having a pivotally retained steering arm extending therefrom and defining a first kingpin pivot axis;
    a first linkage extending between a proximal end being pivotally coupled to the first steering control, and a distal end being pivotally coupled to the proximal end of the first control arm;
    a second linkage extending between a proximal end being pivotally coupled to the proximal end of the first control arm and the distal end of the first linkage, and a distal end being pivotally coupled to the pivotally retained steering arm at a location spaced from the first kingpin pivot axis;
    a second kingpin having a second pivotally retained steering arm extending therefrom and defining a second kingpin pivot axis; and
    a tie rod extending between and being pivotally coupled to the pivotally retained steering arms.

2. The linear-input steering mechanism of claim 1, wherein the first steering control comprises a substantially linear member extending in the substantially vertical plane from a proximal end to a distal end, wherein the proximal end of the first linkage is pivotally coupled to the distal end of the first linear steering-control member.

3. The linear-input steering mechanism of claim 1, wherein the first kingpin defines a first stub axle extending from the first kingpin pivot axis and being angularly spaced from the first steering arm.

4. The linear-input steering mechanism of claim 3, further comprising a hub and wheel assembly rotatably coupled to the first stub axle, such that an in-plane force applied to the first steering control urges the hub and wheel assembly to move through an arc extending about the first kingpin pivot axis.

5. The linear-input steering mechanism of claim 1, further comprising:
    a second steering control movable in a second substantially vertical plane laterally spaced from the first substantially vertical plane;
    a second control arm having a pivotally retained distal end and a proximal end;
    a third linkage extending between a proximal end being pivotally coupled to the second steering control, and a distal end being pivotally coupled to the proximal end of the second control arm; and
    a fourth linkage extending between a proximal end being pivotally coupled to the proximal end of the second control arm and the distal end of the third linkage, and a distal end being pivotally coupled to the second pivotally retained steering arm at a location spaced from the second kingpin axis.

6. The linear-input steering mechanism of claim 1, wherein urging the first steering control to move within the first substantially vertical plane urges the steering arm to pivot about the first kingpin pivot axis.

7. The linear-input steering mechanism of claim 1, wherein the first linkage is coupled to the first steering control at an acute angle relative to the first substantially vertical plane in which the first steering control lies.

8. A commuter vehicle comprising:
    a chassis comprising a frame, opposed first and second steerable front wheels, a trailing rear wheel, and a linear-input steering mechanism for controlling an orientation of the first and second steerable front wheels;
    a drive-train for transmitting rotational motion and torque from a power-input source to rotational motion of the trailing rear wheel, wherein the drive-train comprises a human-powered chain-driven transmission and a battery; and
    a body defining a cockpit and being supported by the chassis, wherein an outer-most lateral dimension of the body corresponds to a maximum outer-most lateral dimension of the commuter vehicle, wherein the linear-input steering mechanism comprises:
        a first steering control movable in a first substantially vertical plane;
        a first control arm having a pivotally retained distal end and a proximal end;
        a first kingpin having a pivotally retained first steering arm and first stub axle extending therefrom, and defining a first kingpin axis;
        a second kingpin having a pivotally retained second steering arm and second stub axle extending therefrom, and defining a second kingpin axis, wherein the first front wheel is rotatably coupled to the first stub axle and the second front wheel is rotatably coupled to the second stub axle;

a first linkage extending between a proximal end being pivotally coupled to the steering control, and a distal end being pivotally coupled to the proximal end of the control arm;

a second linkage extending between a proximal end being pivotally coupled to the proximal end of the control arm and the distal end of the first linkage, and a distal end being pivotally coupled to the pivotally retained first steering arm at a location spaced from the first kingpin axis; and a tie rod pivotally coupled to and extending between the first steering arm and the second steering arm.

9. The commuter vehicle of claim 8, wherein the linear-input steering mechanism comprises one of a slidably mounted handle and a handle being pivotally mounted to pivot in a substantially vertical plane.

10. The commuter vehicle of claim 8, wherein the outer-most lateral dimension of the body is between about 24-inches and about 38-inches.

11. The commuter vehicle of claim 10, wherein the body is so dimensioned as to fit through an open door having an open lateral dimension of about 30-inches.

12. The commuter vehicle of claim 8, wherein the trailing rear wheel is a first trailing rear wheel, the commuter vehicle further comprising a second trailing rear wheel coaxially aligned with and laterally spaced from the first trailing rear wheel.

13. The commuter vehicle of claim 8, wherein the battery is positioned aft of the first and second steerable front wheels.

14. The commuter vehicle of claim 8, wherein the first steering control is movable only in a first substantially vertical plane.

15. The commuter vehicle of claim 8, further comprising:

a second kingpin having a second pivotally retained steering arm extending therefrom and defining a second kingpin pivot axis; and a tie rod extending between and being pivotally coupled to the pivotally retained steering arms.

16. A commuter vehicle comprising:

a chassis comprising a frame, opposed first and second steerable front wheels, a trailing rear wheel, and a linear-input steering mechanism for controlling an orientation of the first and second steerable front wheels;

a drive-train for transmitting rotational motion and torque from a power-input source to rotational motion of the trailing rear wheel, wherein the drive-train comprises a human-powered chain-driven transmission and a battery; and a body defining a cockpit and being supported by the chassis, wherein an outer-most lateral dimension of the body corresponds to a maximum outer-most lateral dimension of the commuter vehicle, wherein the linear-input steering mechanism comprises:

a first steering control movable in a first substantially vertical plane;

a control member having a pivotally retained apex, and a first control arm and a second control arm extending therefrom, wherein the first control arm has a proximal end spaced from the apex and the second control arm has a distal end spaced from the apex;

a first kingpin having a pivotally retained first steering arm and first stub axle extending therefrom, and defining a first kingpin axis;

a second kingpin having a pivotally retained second steering arm and second stub axle extending therefrom, and defining a second kingpin axis, wherein the first front wheel is rotatably coupled to the first stub axle and the second front wheel is rotatably coupled to the second stub axle;

a first linkage extending between a proximal end being pivotally coupled to the steering control, and a distal end being pivotally coupled to the proximal end of the first control arm; and a second linkage extending between a proximal end being pivotally coupled to the distal end of the second control arm and a distal end being pivotally coupled to the pivotally retained first steering arm at a location spaced from the first kingpin axis; and a tie rod pivotally coupled to and extending between the first steering arm and the second steering arm.

* * * * *